US 6,191,806 B1

(12) United States Patent
Mayer

(10) Patent No.: US 6,191,806 B1
(45) Date of Patent: *Feb. 20, 2001

(54) DEMAND-ADAPTIVE SYSTEM AND METHOD FOR TELEPHONE REQUESTED CABLE PROGRAMMING

(75) Inventor: Daniel J. Mayer, Warren, NJ (US)

(73) Assignee: AT&T Corp., Middletown, NJ (US)

( * ) Notice: Under 35 U.S.C. 154(b), the term of this patent shall be extended for 0 days.

This patent is subject to a terminal disclaimer.

(21) Appl. No.: 09/116,626

(22) Filed: Jul. 16, 1998

Related U.S. Application Data

(63) Continuation of application No. 08/581,693, filed on Dec. 29, 1995, now Pat. No. 5,926,204.

(51) Int. Cl.[7] .............................. H04N 7/10; H04N 7/14
(52) U.S. Cl. .................................. 348/7; 348/6; 348/12; 348/13; 455/5.1; 455/6.1
(58) Field of Search ................................ 348/6, 7, 8, 12, 348/13; 455/4.1, 4.2, 5.1, 6.1, 3.1; H04N 7/10, 7/16, 7/173

(56) References Cited

U.S. PATENT DOCUMENTS 4,381,522 * 4/1983 Lambert ............................... 455/4.2
5,572,517 * 11/1996 Safadi .................................... 348/12
5,926,204 * 7/1999 Mayer ..................................... 348/7

* cited by examiner

Primary Examiner—John K. Peng
Assistant Examiner—Linus H. Lo
(74) Attorney, Agent, or Firm—Morgan & Finnegan, LLP

(57) ABSTRACT

A management system and method for use with on-demand cable programming, wherein a customer telephones a cable supplier and requests that a particular video program be played. The management system uses a plurality of video sources, wherein each of the video sources is capable of playing the requested video program. A telephone switch system and routing table are used to route incoming customer requests directly to the interface in control of the video-source serving the region from where the request originated. The volume of requests received from each customer region serviced by the cable supplier is evaluated. If the volume of customer requests surpasses a threshold level, then additional video sources are added to the cable network by the cable supplier. The cable head ends that service the various customer regions are then reassigned among the new number of video sources so that the volume of requests is generally evenly divided among the multiple video sources, concurrently, the routing table is changed to maintain the geographic association between customer regions and each appropriate video source.

3 Claims, 5 Drawing Sheets

DEMAND-ADAPTIVE SYSTEM AND METHOD FOR TELEPHONE REQUESTED CABLE PROGRAMMING

This is a continuation of application Ser. No. 08/581,693, filed Dec. 29, 1995, now U.S. Pat. No. 5,926,204.

BACKGROUND OF THE INVENTION

1. Field of the Invention

The present invention relates to management systems for on-demand cable programming. More specifically, the present invention relates to cable programming management systems that change in response to request demand, whereby a variable number of video sources can be selectively connected to a cable network and allocated to different cable head ends to keep the demand on each video source below a threshold level.

2. Prior Art Statement

Many cable providers offer on-demand programming for movies, music videos and other specialty programming. For movies, the typical prior art approach used by cable providers is to dedicate several cable channels as pay-per-view channels. A different movie is then repeatedly played on each of the pay-per-view channels. If a customer desires to view one of the movies, the customer calls his/her cable provider with the request. The cable provider then enables the customer's cable box to receive the movie at a selected time. Management systems for such prior art programming applications are relatively simple. Since a specific movie is repeatedly played on a dedicated cable channel, the cable provider need only enable a customer's cable box to receive that channel in an unscrambled format. However, since a separate channel must be dedicated to each movie, only a relatively small selection of movies can be offered. Furthermore, on each channel the selected movie is only played at certain times, e.g. at two hour intervals. As such, a customer must wait for the movie start time in order to view the entire movie.

Much more complex programming management systems are used by cable providers that offer true on-demand programming services. Two of the most common on-demand programming services are movie on-demand services and on-demand video jukebox services. Movie on-demand services are typically used by private cable providers, such as hotels and hospitals, that have a relatively small customer base. Conversely, on-demand music video jukebox services are used by many large public cable providers that serve hundreds of thousands of customers. Movie on-demand services used by small private cable providers typically use simple management systems where each request is individually serviced. At one given time, only a small percentage of a hotel's guests or hospital's patients will request a movie. Each guest or patient can therefore be individually accommodated using a relatively small bank of video sources, such as VCRs. However, with on-demand music video jukebox services that are offered by public cable providers, many thousands of requests may be received in a short span of time. Accordingly, it is not practical to provide individual service to such a large pool of customers.

The video jukebox services offered by many cable suppliers use the same overall management system that is used by a traditional coin operated jukebox. In a traditional coin operated jukebox, there is only one record player. As a person puts money into the jukebox, the selected song is saved in a queue where it is played in the order it was received. With cable supplied video jukebox services, a single cable channel is set aside by the cable supplier for the music videos. Customers are then prompted to call their cable suppliers and request a particular music video. The customer is charged and the requested music video is placed in a queue, where it is played in the order that it was received. Although such a management system seems simple, there are many complications that arise from the large degree of variation that occurs in the number of requests received by a cable supplier in a given is period of time. For example, during off-peak hours, only a few requests may be received by a cable supplier. As a result, only a few videos are played on the video jukebox channel. The remainder of the time is occupied by filler material such as commercials or an explanation of services. Since such filler material is typically not interesting to watch, customers change channels. This results in even fewer requests being received and more filler material being aired. Conversely, during peak hours, a cable supplier may be inundated with hundreds of requests. As a result, customers must wait long periods of time before the music video they requested is aired. This causes frustration in the customer, wherein the customer does not believe that he/she is receiving the services for which he/she paid. The customer is therefore much less likely to use the video jukebox services again in the future.

A need therefore exists in the art for a management system that can be applied to on-demand cable programming, wherein the management system is demand responsive and optimizes the organization of cable head ends to provide the requested programming in a time efficient manner.

SUMMARY OF THE INVENTION

The present invention is a management system and method for use with on-demand cable programming, wherein a customer telephones a cable supplier and requests that a particular video program be played. The management system uses a plurality of video sources, wherein each of the video sources is capable of playing the requested video program. A telephone switching system and routing table are used to route incoming customer requests directly to the interface in control of the video source serving the region from where the request originated. The volume of requests received from each customer region serviced by the cable supplier is evaluated. If the volume of customer requests surpasses a threshold level, then additional video sources are added to the cable network by the cable supplier. The cable head ends that service the various customer regions are then reassigned among the new number of video sources so that the volume of requests is generally evenly divided among the multiple video sources, concurrently, the routing table is changed to maintain the geographic association between customer and each appropriate video source. As such, a variable number of video sources can be selectively coupled to a cable network and allocated to different cable head ends to keep the demand on each video source within a range that is acceptable to the expectations of the customers being served.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention program management system and method can be adapted for use with any customer requested on-demand video programming application, the present invention program management system and method is especially well suited for use in conjunction with a cable provider supplied music video jukebox application. Accordingly, for the purposes of an exemplary embodiment, the present invention program management system and method will be described in conjunction with a cable provider supplied music video jukebox application.

Figure 1:
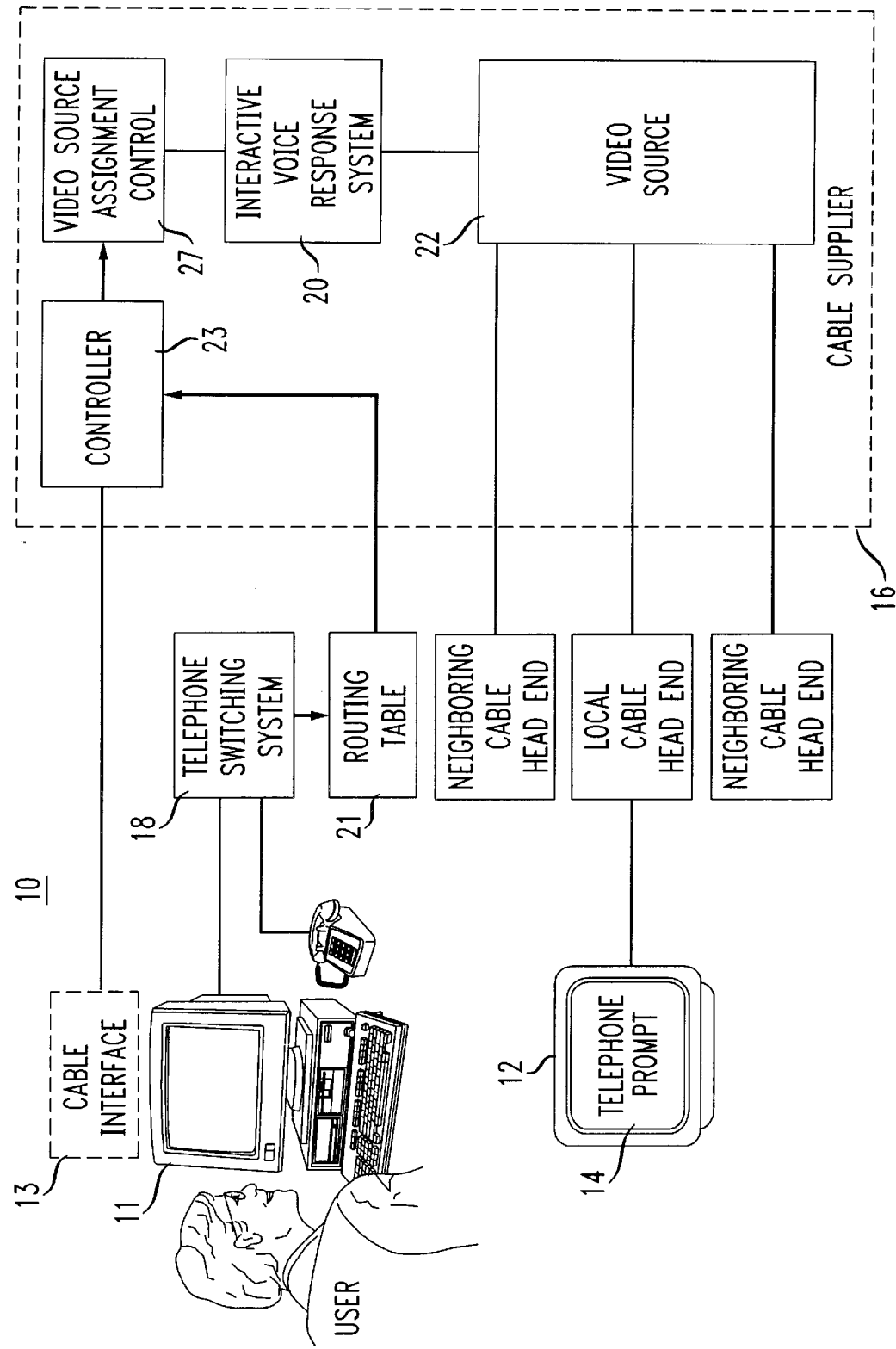
FIG. 1 is a block diagram schematic showing the basic configuration of an on-demand video jukebox service as offered by a local cable supplier.

Referring to FIG. 1, a high level block diagram of a cable provider supplied video jukebox system 10 is shown in accordance with the present invention. In this configuration, a customer turns on the video jukebox channel on his/her television set 12. The television set 12 provides a prompt 14 instructing the customer as to what telephone number must be called to order a specific music video. The telephone call from the customer is received by the cable supplier 16 via a traditional telephone switching system 18, that enables one telephone number to be called by customers regardless of their geographical location. A routing table 21 routes the call to a video source assignment control 27 that is responsive to a central controller 23. As would be understood by a person skilled in the art, video requests may also be made via alternate mediums, for example, on-line from a computer 11 via the Internet, e.g., wherein the geographic location of the user depends on the phone number from which the user calls the Internet access provider . In addition, video requests may be made, for example, directly through the cable network via a cable interface 13.

As will be later explained, the controller 23 evaluates customer demand and directs the video source assignment control 27 to connect the call to an interactive voice response system 20. The interactive voice response system 20 interfaces with a video source 22 supplying a signal being viewed by the caller. The telephone call is responded to at the cable supplier 16 by an interactive voice response system 20, which can be a menu driven system, a voice recognition system, a touch tone automated system or a live operator. As would be understood, automatic number identification (ANI)may also be utilized in the determination of call origin. The interactive voice response system 20 directs a video source 22 to play the customer's selection in the order that the customer's request is received. As will also be explained, the video source 22 is coupled to one of a plurality of cable head ends, via a cable head end assignment control (not shown in FIG. 1). It is common for a cable supplier 16 to utilize a plurality of cable head ends to supply its customers. For the purposes of this disclosure, a cable head end is the smallest, undivided broadcast unit capable of being broadcast by the cable supplier 16, wherein each cable head end must broadcast the same video material on each channel to all the homes connected to the cable supplier 16 via that cable head end.

Figure 2:
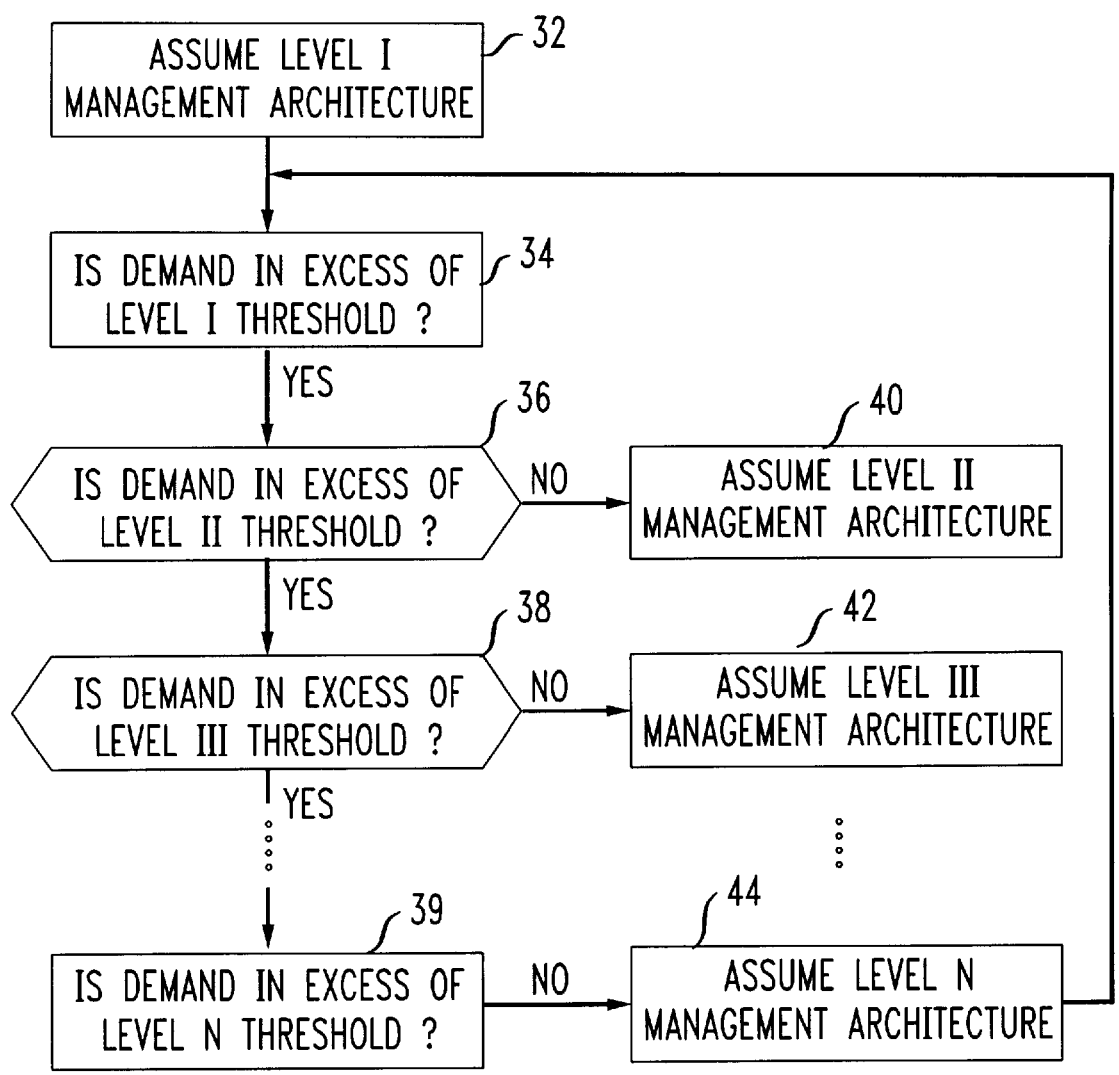
FIG. 2 is a logic diagram showing the preferred method of operation for the present invention management system.

Referring to FIG. 2, a general schematic showing the overall operation of an advantageous embodiment of the present invention system and method is shown. The present invention system and method uses a plurality of progressive management architectures in order to respond to increasing degrees of customer demand. The first level management architecture is the simplest in complexity and is intended for use during off-peak periods where customer demand is low. Subsequent level management architectures are progressively more complex in response to growing customer demand, wherein alternate video environments are replicated and customer calls are routed to match the video programming in the alternate video environments.

In the shown embodiment of FIG. 2, a plurality of separate management architectures are used in response to changes in customer demand. As will be understood, the use of three separate management architectures specifically shown in FIG. 2 is merely exemplary and any plurality of progressively complex management architectures can be used. As indicated by the first block 32 in FIG. 2, the present invention system 30 first assumes that customer demand is low and therefore assumes a Level I management architecture. As will be later explained, a Level I management architecture uses a single video source, wherein all the cable head ends used by the cable supplier are coupled to the single video source.

As is indicated by the second block 34, third block 36 and fourth block 38 in FIG. 2, the level of customer demand is evaluated by the present invention system and method 30. If the level of demand exceeds a threshold value for the Level I management architecture, then a Level II management architecture is assumed, as indicated by block 40. If the level of demand exceeds a threshold value for the Level II management architecture, then a Level III management architecture is assumed, as indicated by block 42. As will later be explained, the Level II management architecture uses two video sources while the Level III management level uses N video sources. As indicated by block 39 and 44 subsequent levels can be used in alternate embodiments, wherein the number of the level corresponds to the number of video sources used by that level. The level of the management architecture can be increased to a level corresponding to the number of cable head ends used by the cable supplier 16, wherein each cable head end is serviced by its own video source. The change between management architecture levels is entirely dependent upon customer demand. As a result, the change in management architecture levels need not be sequential, and a Level I management architecture can change directly into any other management architecture level and vice versa.

Figure 3:
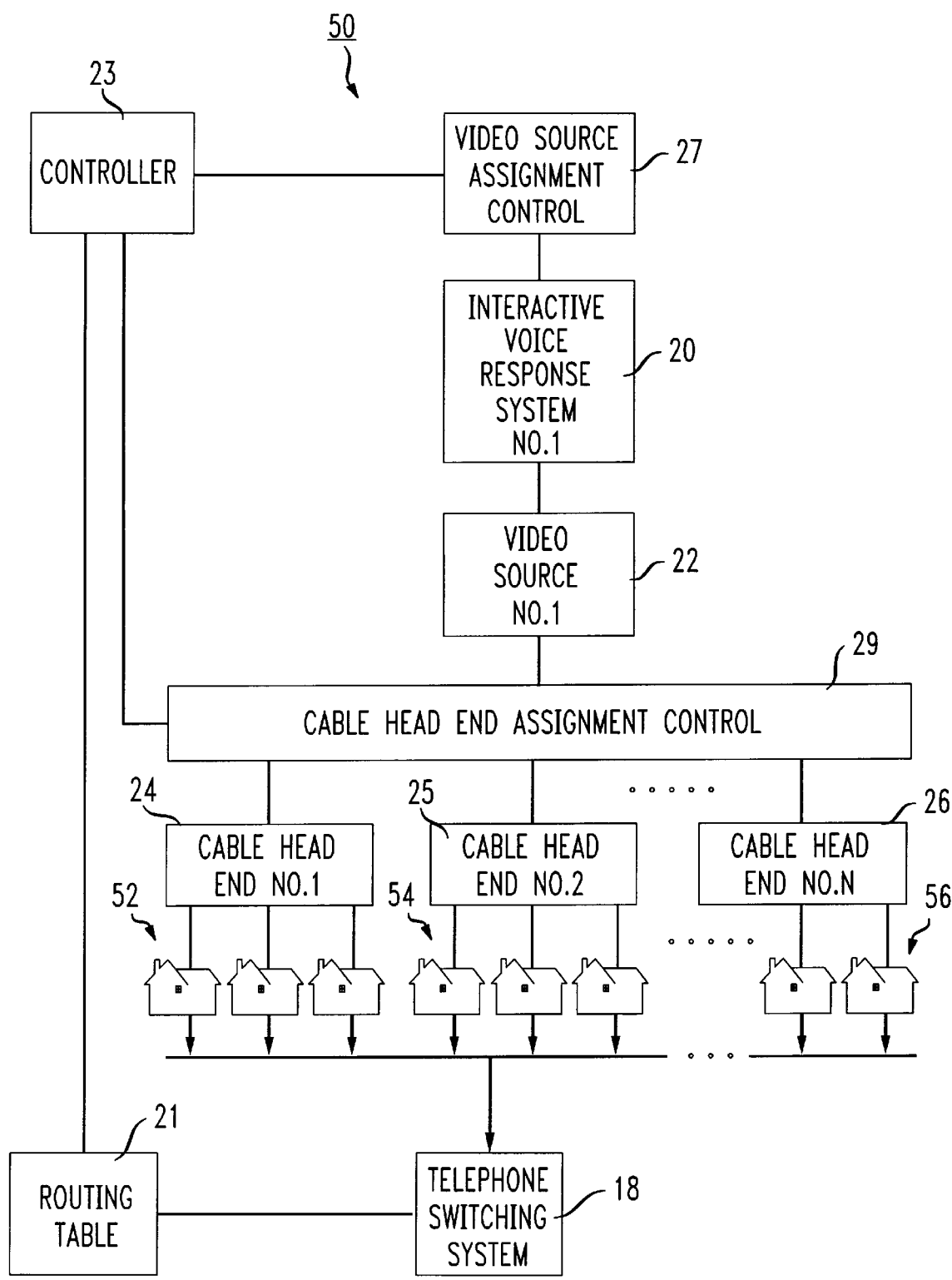
FIG. 3 is a block diagram schematic showing a preferred embodiment of a Level I management architecture used by the present invention management system.

Referring to FIG. 3, an advantageous embodiment of the Level I management architecture 50 is shown. In this embodiment, a cable supplier broadcasts over some finite number of cable head ends 24, 25, 26. Each of the cable head ends 24, 25, 26 supplies a corresponding customer region 52, 54, 56, respectively. Customers telephone requests from the various customer regions 52, 54, 56. The telephone requests are received by the cable supplier via the telephone switching system 18. The routing table 21 is capable of identifying incoming calls by the customer region 52, 54, 56 from which the telephone call originated. In connection with the controller, the routing table is updated to maintain the geographic association between customer regions and each appropriate video source. However, in the low demand Level I management architecture 50 such source addressing is unnecessary. The controller 23 evaluates demand and assumes the appropriate level management architecture for the demand. In the shown Level I management architecture 50, demand is low and only one interactive voice response system 20 and one video source 22 are used. Consequently, the controller 23 directs the video source assignment control 27 to direct all incoming calls to the sole interactive voice response system 20. The telephone calls are then answered by the interactive voice response system 20 that enters the customer selection into the queue of the single video source 22. Since demand is low and the controller 23 is recognizing a Level I management architecture 50, the controller 23 instructs the cable head end assignment control 29 to assign all of the cable head ends 24, 25, 26 to the single video source 22. Consequently, the signal from the single video source 22 is broadcast out to all the cable head ends 24, 25, 26 and is thus received by all the customer regions 52, 54, 56.

The Level I management architecture 50 of FIG. 3 represents the simplest management architecture where one video source 22 and one interactive voice response system 20 are capable of servicing the entire customer demand from all of the customer regions 52, 54, 56. Since only one video source 22 and one interactive voice response system 20 are being used, all request calls regardless of origin, or cable head end service are added to the queue of the single video source 22.

Since the Level I management architecture 50 embodied by FIG. 3 only has one interactive voice response system 20 and only one video source 22, the purpose of the routing table 21 and controller 23 are not immediately apparent. As will be later explained, the routing table 21 and controller 23 serve more apparent functions in higher level management architectures, where multiple video sources and interactive voice response systems are used.

When the controller 23 recognizes that customer demand has surpassed certain threshold levels, the present invention system changes from a Level I management architecture to a subsequent level management architecture. The threshold level evaluated by the controller 23 can be dependent upon many variables but is preferably dependent upon the size of the queue created by customer requests. For example, if there are less than twenty customer requests per hour, the present invention system may remain in a Level I management architecture. However, if the queue of customer requests grows to be between twenty and forty requests per hour, a Level II management architecture may be embodied. For a queue of customer requests of between forty and sixty requests per hour, a Level III management architecture would be used. Such threshold levels are merely exemplary and any alternative values can be used by a cable supplier. The higher the threshold level, the larger the queue for any one given video source. As a result, a large threshold may result in a customer having to wait a long time to see the video that he/she ordered. The setting of the appropriate threshold level for a given time, day and date is therefore a business decision that is made by the cable supplier. As would be understood, the threshold levels for transitioning between levels may have a hysteresis band to avoid unstable "hunting" behavior between levels.

Figure 4:
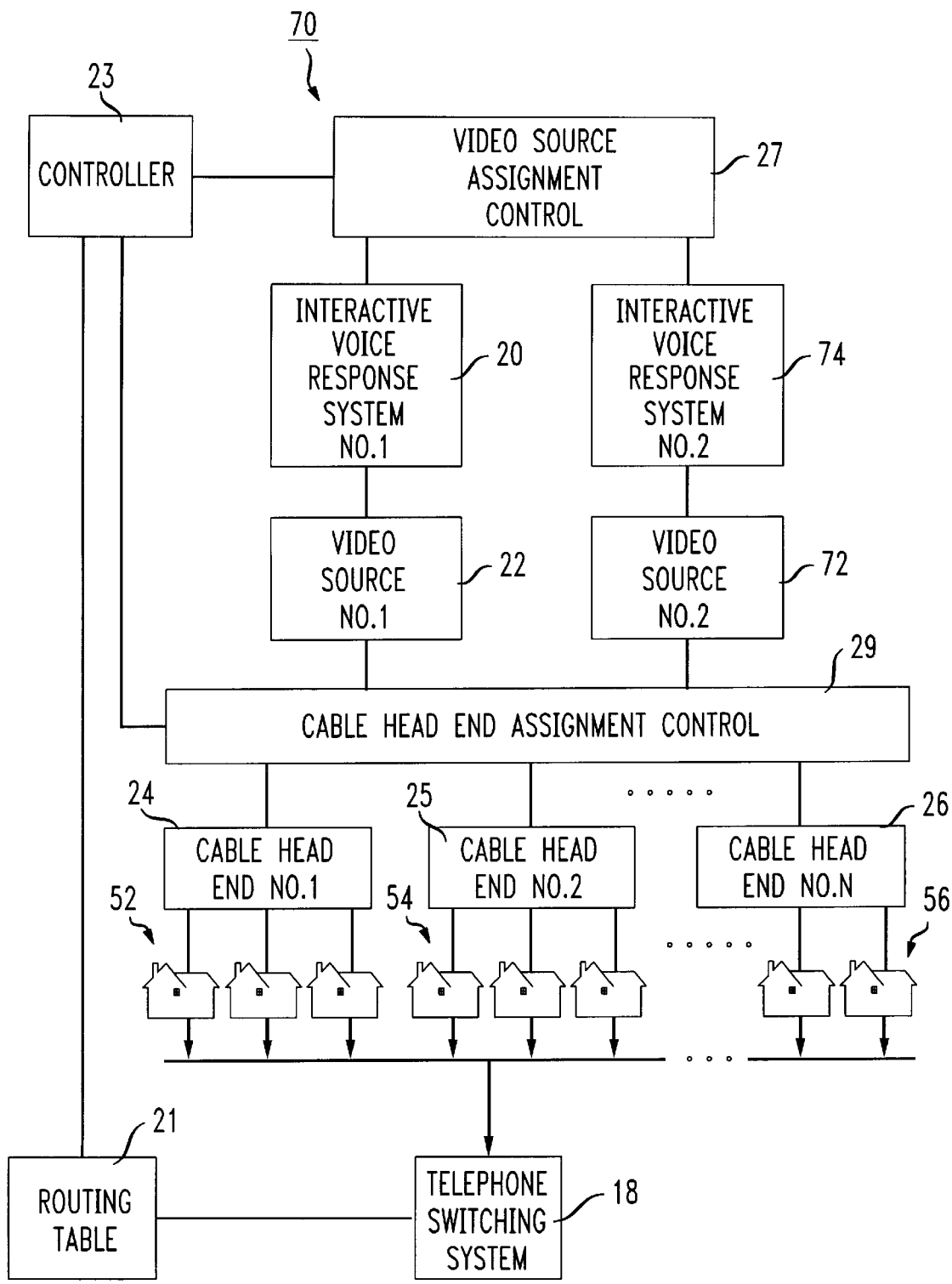
FIG. 4 is a block diagram schematic showing a preferred embodiment of a Level II management architecture used by the present invention management system.

Referring now to FIG. 4, a preferred embodiment of a Level II management architecture 70 is shown. When customer demand surpasses the threshold value assigned to the Level I management architecture, a single video source is incapable of playing all the customer requests in the queue within a reasonable period of time. As such, a second video source 72 is used in conjunction with the original first video source 22. A second interactive voice response system 74 is assigned to the second video source 72. As can be seen from FIG. 4, once a cable supplier assumes a Level II management architecture 70, the video source assignment control 27 has the task of directing the incoming telephone calls to either the first interactive voice response system 20 or the newly introduced second interactive voice response system 74. Furthermore, the cable head assignment control 29 has the task of assigning different cable head ends 24, 25, 26 to either the first video source 22 or the second video source 72.

The controller 23 directs the operation of the video source assignment control 27 and the cable head end assignment control 29. In regard to the operation of the cable head end assignment control 29, the decision as to which of the cable head ends 24, 25, 26 is assigned to which of the two video sources 22, 72 is dependent upon demand. The assignments are preferably made to balance the request queue between the two video sources 22, 72. The controller 23 evaluates the volume of calls received by the routing table 21. Since the routing table distinguishes the incoming calls by their customer region of origin, the controller 23 is capable of evaluating the demand generated by each of the customer regions 52, 54, 56 served by the various cable head ends 24, 25, 26. Depending upon how many calls are being received from the various customer regions 52, 54, 56, the controller 23 instructs the cable head end assignment control 29 to assign the cable head ends 24, 25, 26 to either the first video source 22 or the second video source 72 in a manner that divides the request queue to be most even. As a result, if one customer region 56 is generating a disproportionate amount of requests, it is possible that only the cable head end 26 serving that customer region 56 would be assigned to the second video source 72. Conversely, if the customer demand is relatively even across the various customer regions 52, 54, 56, then the controller 23 will divide the cable head ends 24, 25, 26 approximately evenly between the first video source 22 and the second video source 72.

After the controller 23 has instructed the cable head end assignment control 29 to assign the different cable head ends 24, 25, 26 to the two video sources 22, 72, the incoming calls are also separated between the two interactive voice response systems 20, 72. Telephone calls received by the telephone switching system 18 are distinguished by the routing table 21 by the customer region of origin. As mentioned, the routing table is changed based on input from the controller to maintain the geographic association between customer regions and each appropriate video source. Request calls received from customers served by the cable head ends 24, 25 assigned to the first video source 22, are directed to the interactive voice response system 20 for the first video source 22. Similarly, request calls received from customers served by the cable head ends 26 assigned to the second video source 72, are directed to the interactive voice response system 74 for the second video source 72. Consequently, request calls are sorted by the customer region from which the request calls originate and are then forwarded to the interactive voice response system for the video source that serves that customer region.

Figure 5:
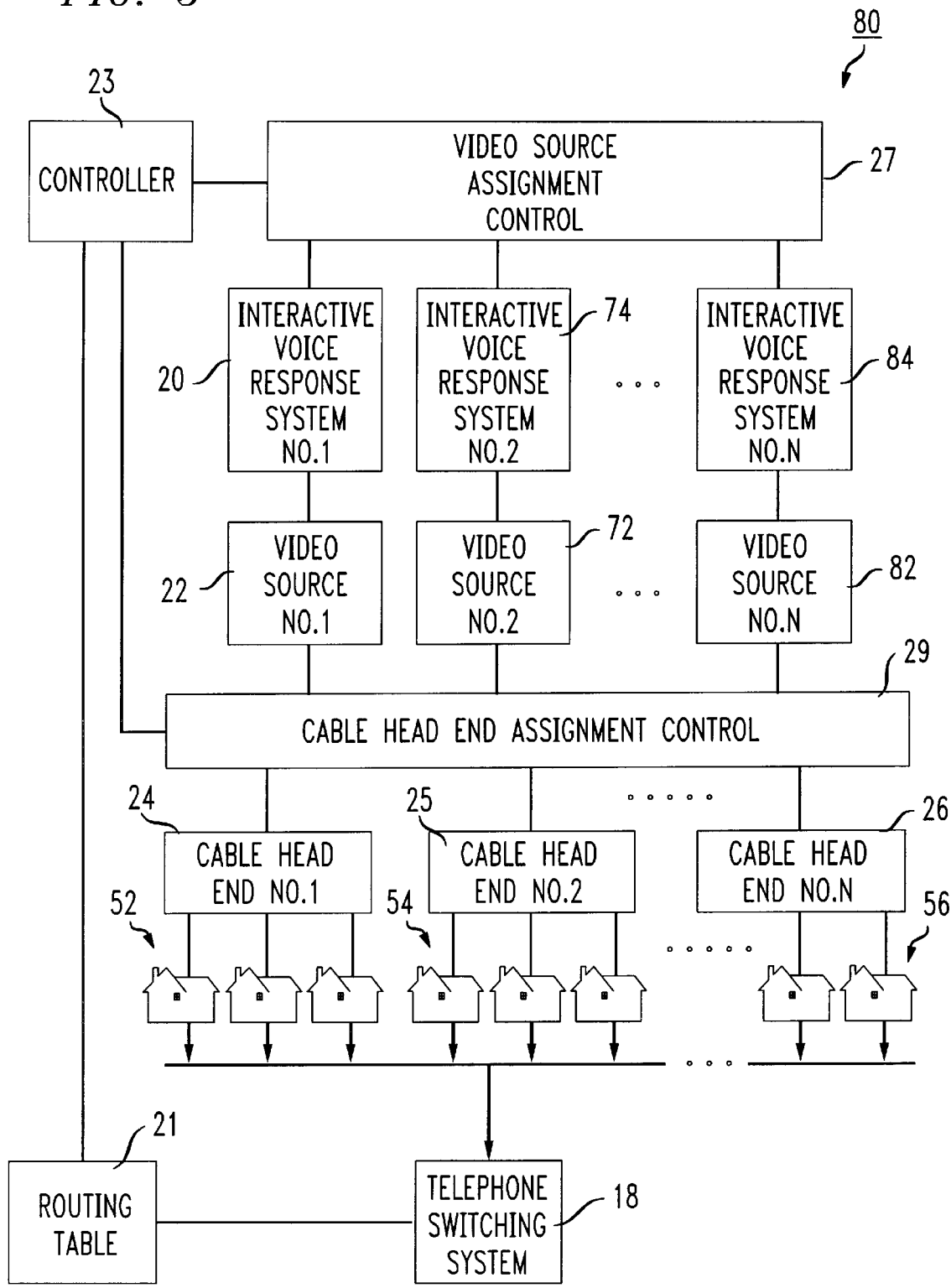
FIG. 5 is a block diagram schematic showing a preferred embodiment of a $N^{th}$ Level management architecture used by the present invention management system.

Referring to FIG. 5, a preferred embodiment of an $N^{th}$ Level management architecture 80 is shown. During peak periods, it is possible that neither one nor two separate video sources would be sufficient to serve the customer request queue in a reasonable amount of time. In such a circumstance, at least one subsequent video source must be used. In the exemplary embodiment of FIG. 5, an $N^{th}$ Level management architecture 80 is shown having at least one subsequent video source 82 and a corresponding number of subsequent interactive voice response systems 84.

As with the Level II management architecture, when the controller 23 evaluates demand and assumes an $N^{th}$ Level management architecture 80, the different cable head ends 24, 25, 26 are assigned to the first video source 22, second video source 72 and subsequent video sources 82, respectively, by the cable head end assignment control 29. The decision as to which cable head end 24, 25, 26 is assigned to which of the video sources 22, 72, 82 is made by the controller 23 and is again dependent upon customer demand. Cable head end assignments are preferably made to balance the customer request queue among the multiple video sources 22, 72, 82. By balancing the customer request queue, a customer would have to wait the least amount of time to view the music video that he/she ordered.

The routing table 21 identifies the customer region origin of the telephone calls received by the telephone switching system 18. Depending upon how many calls are being received from the various customer regions 52, 54, 56, the controller 23 instructs the cable head end assignment control 29 to assign the various cable head ends 24, 25, 26 to one of the N video sources 22, 72, 82 in a manner that approximately evenly divides the customer request queue. After the cable head ends 24, 25, 26 have been assigned to the various video sources 22, 72, 82, the controller 23 directs the video source assignment control 27 to direct customer request calls, received from the various customer regions 52, 54, 56, to the appropriate interactive voice response system 20, 74, 84. Customer request calls received from customer regions assigned to the subsequent video sources 82 are directed to the interactive voice response systems 84 that serves the subsequent video sources 82. Likewise, customer request calls received from the customer regions assigned to the first video source 22 and the second video source 72 are directed to the interactive voice response systems 20, 74 that serve those video sources, respectively.

The number of video sources used by the present invention system can be increased up to the number of cable head ends used by the cable supplier. For instance, if a cable supplier has one hundred cable head ends, then that cable supplier can increase the number of video sources to one hundred so that each cable head end is serviced by its own video source and interactive voice response system. As would be understood, the controller and routing table are not limited to a single cable supplier. That is, the controller and routing table may operate in connection with a number of different cable providers in order to provide maximum efficiency for the video jukebox system. Accordingly, the controller need not be located within the confines of a cable supplier, as would be understood.

As customer demand falls, the number of video sources decreases to a minimum of one. Transitions between one video source and multiple video sources can be synchronized to occur at the dead space at the end of a music video or in between commercials or other fill material. As a result, a person watching the video jukebox channel will not be able to detect when his/her customer region has been allocated to a different video source.

It will be understood that the embodiments of a present invention specifically described are merely exemplary and a person skilled in the art can make alternate embodiments, modifications and alterations to the embodiments described. All such embodiments, modifications and alterations are intended to be included in the scope of the present invention as set forth by the appended claims.

What is claimed is:

1. A video jukebox management system for use by a cable supplier that broadcasts on-request video program services across a plurality of cable heads, said system comprising;

a plurality of video programs, wherein each of said video programs is capable of being played through a plurality of video sources;

control means for selectively scheduling the playing of each of said plurality of programs through at least a selected one of said plurality of video sources;

control means for selectively assigning each of said cable head ends to one of a number of said video sources, wherein the number of video sources is dependent upon the amount of video requests received by the cable supplier;

means for varying said number of said video sources in response to a number of video requests such that each requested video program is viewed by a corresponding requester within a reasonable time period; and means for assigning said cable heads to said video sources to balance customer request queue among said number of said video sources.

2. The system according to claim 1, further including a telephone call response means, associated with each one of said video sources, for instructing a video source coupled thereto to play a particular video program in response to a telephone request.

3. A method of supplying on-request video program services to a cable system having multiple cable head ends, wherein each of said cable head ends services a customer region, said method comprising the steps of:

providing a plurality of video programs, wherein each of said video programs is capable of being played through a plurality of video sources in response to a customer request;

scheduling the playing of each requested video program through at least a select one said video sources;

connecting each of said cable head ends to one of a number of said plurality of video sources;

varying said number of video sources in response to the number of video requests such that each requested video program is viewed by a corresponding requestor; and assigning said cable heads to said video sources to balance customer request queue among said number of said video sources.

* * * * *